US012478540B1

(12) United States Patent
Ge et al.

(10) Patent No.: US 12,478,540 B1
(45) Date of Patent: Nov. 25, 2025

(54) HYDROTHERAPY MACHINE

(71) Applicant: Huaian Mimir Electric Appliance Co., Ltd., Jiangsu (CN)

(72) Inventors: Jun Ge, Jiangsu (CN); Zhenlong Zhu, Jiangsu (CN); Mingyi Ge, Jiangsu (CN)

( * ) Notice: Subject to any disclaimer, the term of this patent is extended or adjusted under 35 U.S.C. 154(b) by 0 days.

(21) Appl. No.: 19/269,085

(22) Filed: Jul. 15, 2025

(30) Foreign Application Priority Data

Apr. 14, 2025 (CN) ........................ 202520696168.4

(51) Int. Cl.
*A61H 9/00* (2006.01)

(52) U.S. Cl.
CPC ..... *A61H 9/0021* (2013.01); *A61H 2201/013* (2013.01); *A61H 2201/0165* (2013.01); *A61H 2201/1207* (2013.01); *A61H 2201/1676* (2013.01); *A61H 2201/5056* (2013.01)

(58) Field of Classification Search
CPC .... A61H 9/0021; A61H 9/0028; A61H 33/00; A61H 33/0087; A61H 33/0091; A61H 33/60; A61H 33/6089; A61H 33/6052; A61H 33/6021; A61H 33/6026; A61H 33/6036; A63B 69/125; A47K 3/10; E04H 4/0006
USPC .......................................................... 601/167
See application file for complete search history.

(56) References Cited

U.S. PATENT DOCUMENTS

| | | | | |
|---|---|---|---|---|
| 4,561,133 A * | 12/1985 | Laing | A63B 69/125 | 4/491 |
| 5,807,289 A * | 9/1998 | Camp | A61H 33/6047 | 601/154 |
| 6,401,273 B1 * | 6/2002 | Fung | A61H 33/6047 | 4/541.4 |
| 2024/0099518 A1 * | 3/2024 | Siu | A61H 33/6047 | |
| 2025/0152469 A1 * | 5/2025 | Li | A61H 33/0091 | |

* cited by examiner

*Primary Examiner* — Victoria Murphy
*Assistant Examiner* — Kelsey Rhee

(57) ABSTRACT

A hydrotherapy machine, comprising a shell, the shell is provided with a battery, a drive motor, and water absorbing fan blades, the water absorbing fan blades are connected to an output shaft of the drive motor; a front end of the shell is provided with external water inlets, the external water inlets are opposite to the water absorbing fan blades; the shell is further provided with a bowl-shaped spray head; the shell is further provided with a water passage for guiding water sucked from the external water inlets to the spray head; the shell comprises a front shell and a rear shell, the front shell and the rear shell are configured to rotate relative to each other; the water passage comprises a water guide shell that wraps around the water absorbing fan blades, and a water guide channel that extends downward from the water guide shell.

10 Claims, 10 Drawing Sheets

HYDROTHERAPY MACHINE

1. TECHNICAL FIELD

The invention relates to a hydrotherapy machine.

2. BACKGROUND ART

CN 222033048 U discloses a hydrotherapy machine, comprising a shell, the shell is provided with a first accommodating chamber, a first water inlet, and a first water outlet; the first accommodating chamber, the first water inlet, and the first water outlet are interconnected;

further comprising a drive assembly, the drive assembly comprises a control mainboard, a power supply, a drive motor, and fan blades, with the power supply electrically connected to the drive motor; the drive motor is provided with a drive shaft, and the fan blades are sleeved on the drive shaft so that the drive motor rotates the fan blades via the drive shaft, driving the water to flow sequentially through the first water inlet and the first water outlet, forming a water flow for hydrotherapy purposes.

The first water outlet is formed on the nozzle, the nozzle is bowl-shaped, so that the nozzle can swing freely to adjust the water outflow direction. However, the adjustment of the water outflow direction is limited to the method of adjusting the nozzle, and the direction adjustment is limited.

3. SUMMARY OF THE INVENTION

In order to overcome the above-mentioned deficiencies of existing hydrotherapy machines, the invention provides a hydrotherapy machine that allows for a greater adjustment of the water outflow direction.

In order to solve the above technical problems, the technical solution of the invention to is as follows: a hydrotherapy machine, comprising a shell, the shell is provided with a battery, a drive motor, and water absorbing fan blades, the battery is positioned at a rear part of the shell, the drive motor is located at a front part of the shell, the water absorbing fan blades are located in front of the drive motor and are connected to an output shaft of the drive motor;

- a front end of the shell is provided with external water inlets, the external water inlets are opposite to the water absorbing fan blades;
- the shell is further provided with a bowl-shaped spray head;
- the shell is further provided with a water passage for guiding water sucked from the external water inlets to the spray head;
- the shell comprises a front shell and a rear shell, the front shell and the rear shell are configured to rotate relative to each other;
- the water passage comprises a water guide shell that wraps around the water absorbing fan blades, and a water guide channel that extends downward from the water guide shell, a front end surface of the water guide shell is provided with an internal water inlet facing the external water inlets, a rear end of the water guide shell is sleeved on the drive motor;
- a lower part of the water guide channel is adapted to the spray head, and the spray head is sleeved on the lower part of the water guide channel, a lower end of the spray head is provided with a water spray port;

- a lower end surface of the front shell is provided with an opening that is adapted to the spray head, the spray head is inserted into the opening, with the water spray port exposed.

Further, an outer side of a lower end of the water guide channel is provided with a sealing ring, the sealing ring abuts against an inner side wall of the spray head.

Further, a rear end of the front shell is provided with a recessed ring, a front end of the rear shell is provided with a protruding ring, the protruding ring is inserted into the recessed ring; alternatively, the rear end of the front shell is provided with a protruding ring, and the front end of the rear shell is provided with a recessed ring, with the protruding ring fitting into the recessed ring.

Further, the front shell comprises a first front side shell, a second front side shell, and a third bottom shell, the first front side shell and the second front side shell are joined together, and the third bottom shell is connected to lower ends of the first front side shell and the second front side shell.

Further, the first front side shell and the second front side shell are connected by snap-fit or ultrasonic welding, the third bottom shell is respectively snap-fitted or ultrasonically welded to the first front side shell and the second front side shell.

Further, the rear shell comprises a first rear side shell, a second rear side shell, and a third tail cover, the first rear side shell and the second rear side shell are joined together, and the third tail cover is connected to rear ends of the first rear side shell and the second rear side shell.

Further, the first rear side shell and the second rear side shell are snap-fitted or ultrasonic welding; the third tail cover is respectively snap-fitted or ultrasonically welded to the first rear side shell and the second rear side shell.

Further, a protruding boss is arranged at a rear end of the rear shell, the protruding boss is provided with an air tube connector extending into an interior of the rear shell, a surface of the protruding boss is provided with a curved ventilation groove, the air tube connector communicates with the ventilation groove, a tube is sleeved on the air tube connector, and the tube extends into the front shell;

- a knob is sleeved on the protruding boss, and an inner end surface of the knob is provided with inwardly protruding portions, the protruding portions abut against an end surface of the protruding boss;
- an end surface of the knob is provided with ventilation holes that pass through the end surface, and ends of the ventilation holes penetrate the protruding portions;
- when the knob is rotated, the ventilation holes can align with the ventilation groove.

Further, the ventilation groove gradually widens from its head to tail, and the air tube connector communicates with the ventilation groove at the tail or the head of the ventilation groove.

Further, the protruding boss is provided with a central groove, and the knob is provided with a central shaft, the central shaft passes through the central groove The invention has following advantageous effects: the hydrotherapy machine of the invention can adjust the water flow ejected from the water spray port in multiple directions: on one hand, the same as in the prior art, the spray head is bowl-shaped, allowing the spray head to swing freely to adjust the water outflow direction; on the other hand; since the front shell and the rear shell is configured to rotate relative to each other, and the rear end of the water guide shell of the water passage is sleeved on the drive motor, the front shell and the water passage can rotate; when the front shell rotates, it can drive the water passage and the spray head to rotate synchronously, enabling the adjustment of the water outflow direction in another direction.

4. BRIEF DESCRIPTION OF ACCOMPANYING DRAWINGS

5. SPECIFIC EMBODIMENT OF THE INVENTION

The invention will be further described in detail below with reference to the accompanying drawings and specific embodiments.

Figure 1:
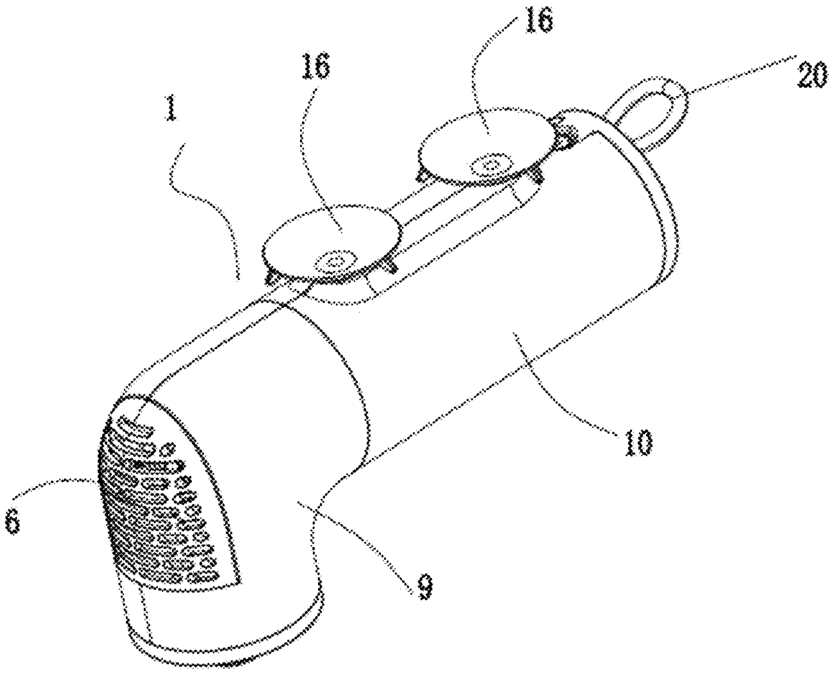
FIG. 1 is a schematic diagram of the structure of the invention.
Figure 2:
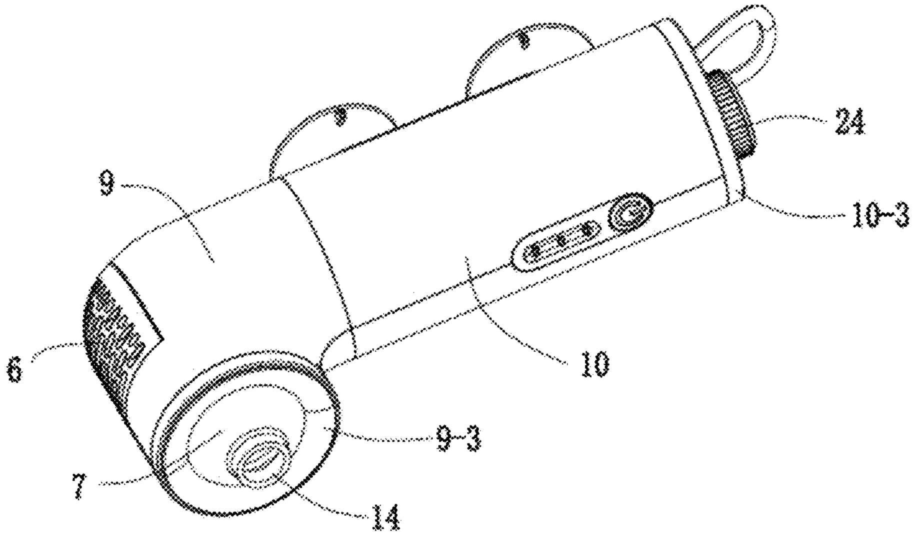
FIG. 2 is a schematic diagram of the structure of the invention from another angle.
Figure 3:
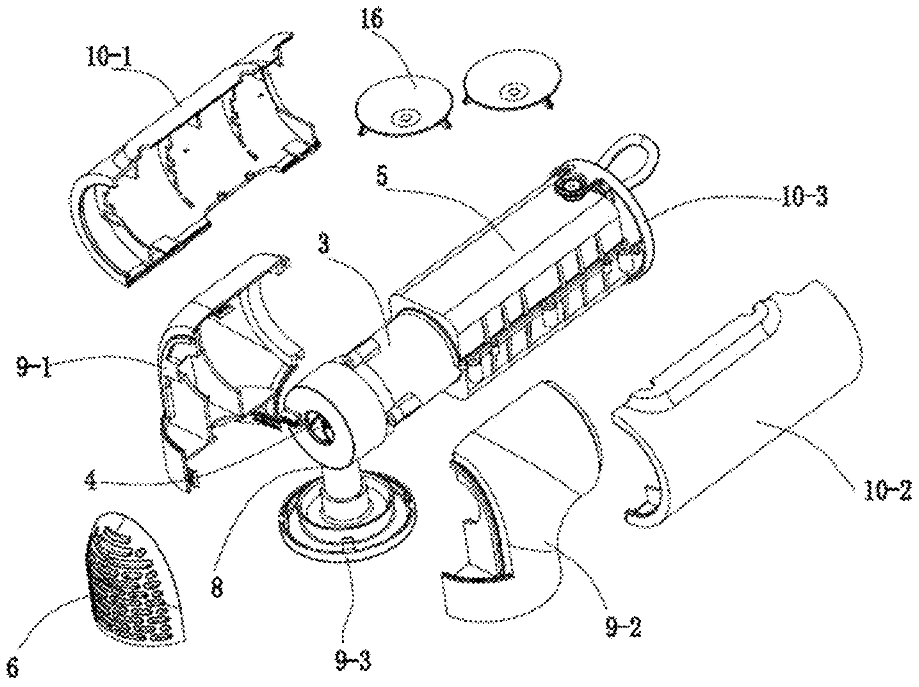
FIG. 3 is an exploded view of the invention.
Figure 4:
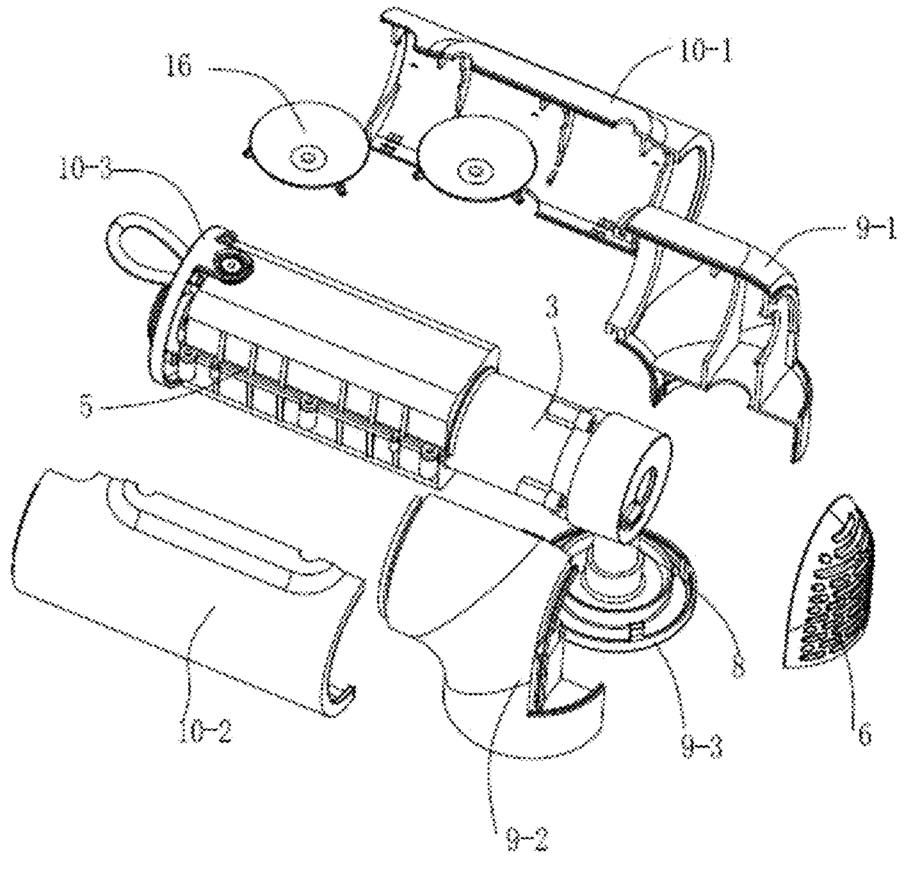
FIG. 4 is an exploded view of the invention from another angle.
Figure 5:
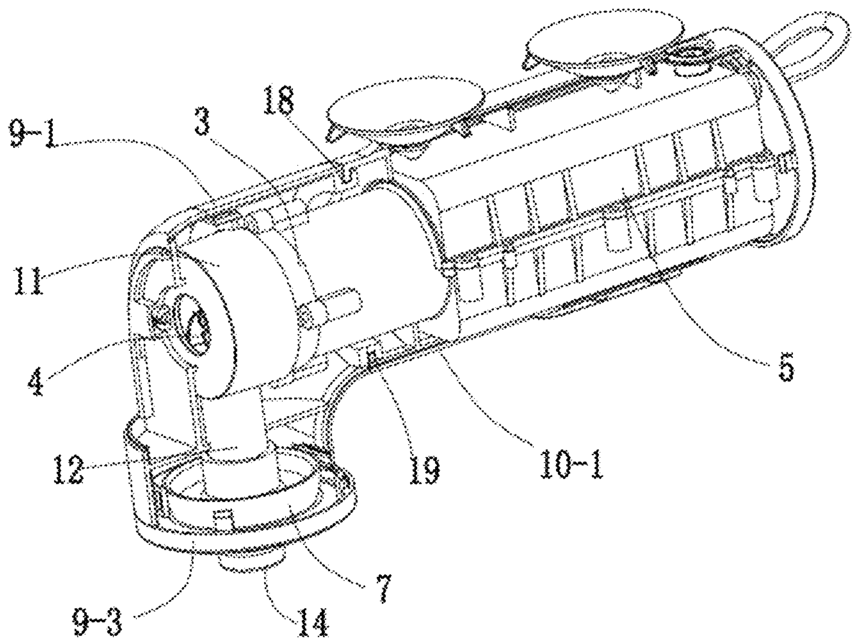
FIG. 5 is an internal structure diagram of the invention.
Figure 6:
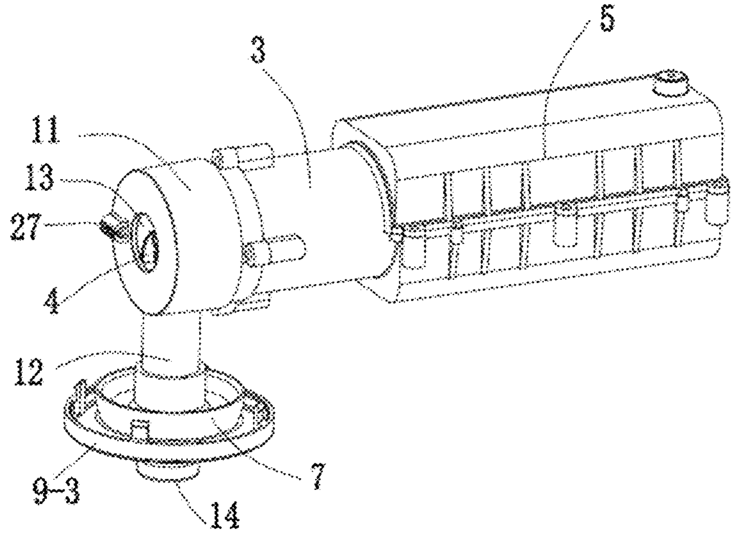
FIG. 6 is an assembly diagram of the battery, drive motor, water absorbing fan blades, water passage, and spray head.
Figure 7:
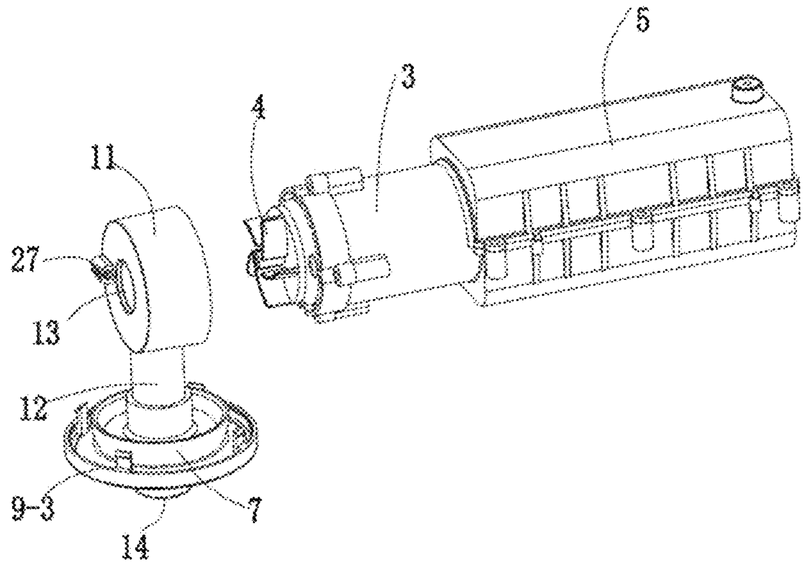
FIG. 7 is an exploded view of FIG. 6.
Figure 8:
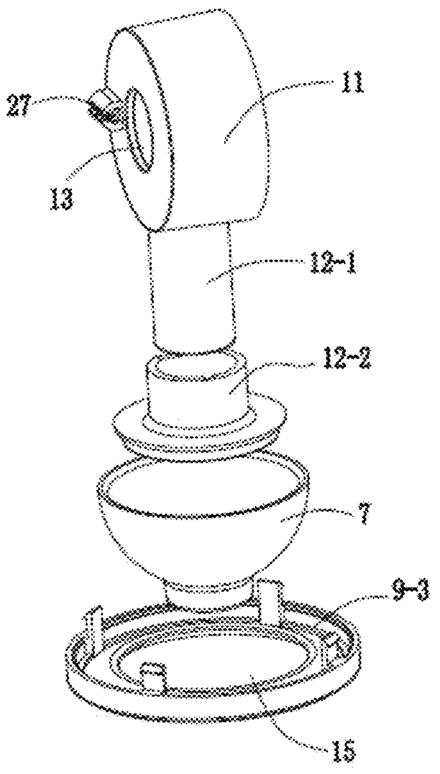
FIG. 8 is an exploded view of the water passage and the spray head.
Figure 9:
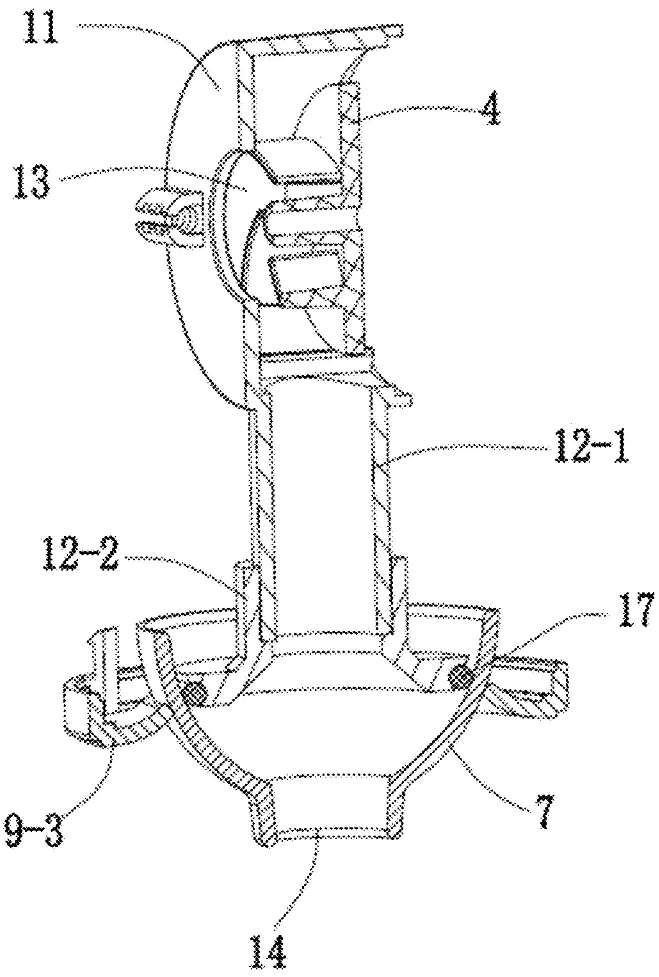
FIG. 9 is a cross-sectional view of the water suction fan blade, the water channel, and the sprinkler head.
Figure 10:
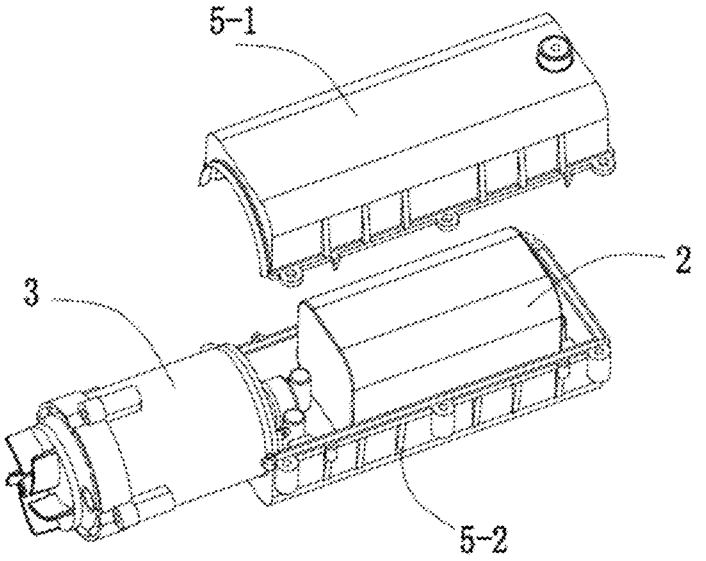
FIG. 10 is an exploded assembly view of the battery case.
Figure 11:
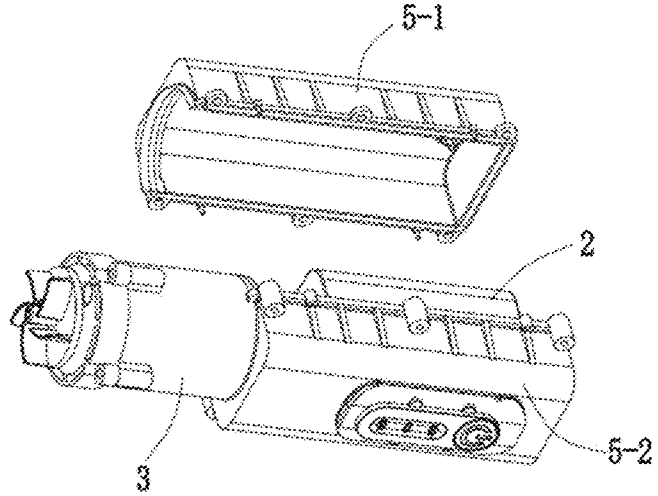
FIG. 11 is an exploded assembly view of the battery case from another angle.
Figure 12:
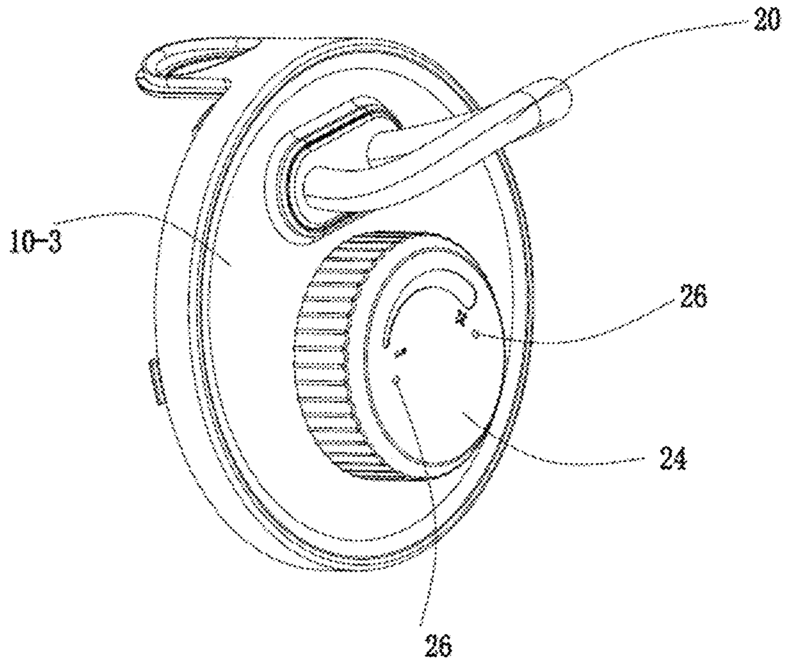
FIG. 12 is a schematic diagram of the assembly of the third tail cover and the knob.
Figure 13:
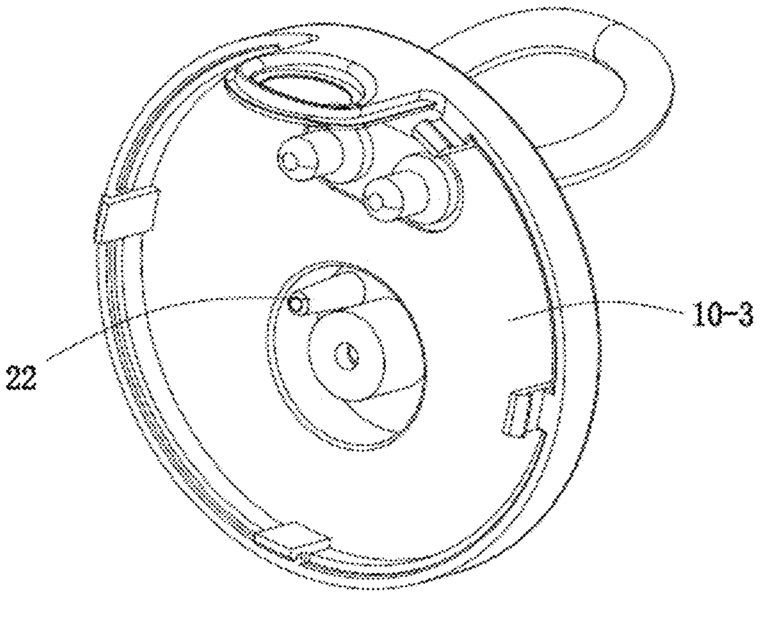
FIG. 13 is a schematic diagram of the assembly of the third tail cover and the knob from another angle.
Figure 14:
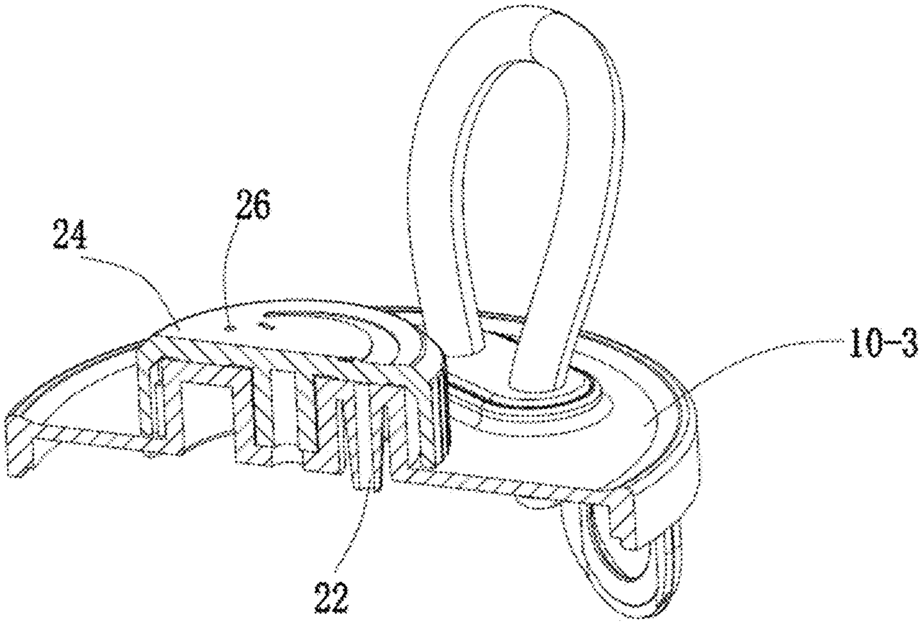
FIG. 14 is a cross-sectional view of the third tail cover and the knob.
Figure 15:
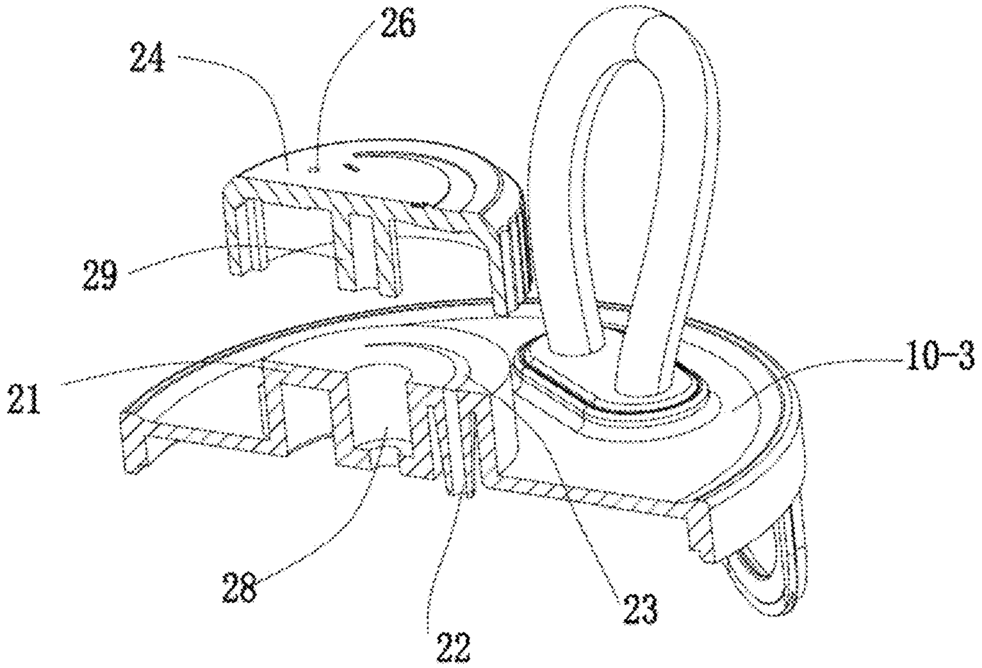
FIG. 15 is a cross-sectional and exploded diagram of the third tail cover and the knob.
Figure 16:
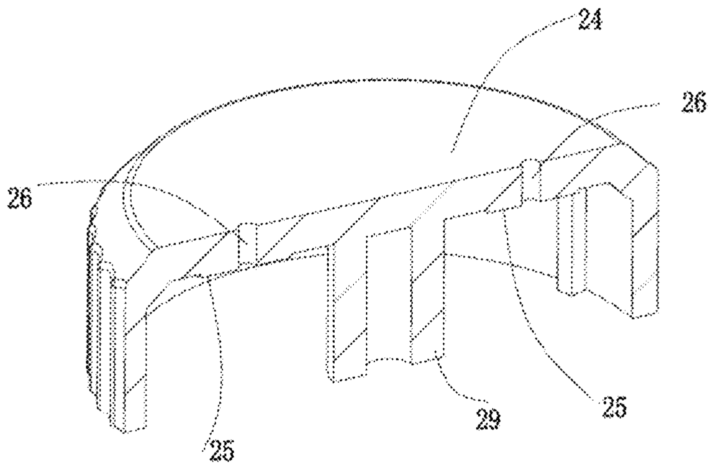
FIG. 16 is a cross-sectional view of the knob.

Please refer to FIGS. 1 to 16, a hydrotherapy machine, comprising a shell 1, the shell 1 is provided with a battery 2, a drive motor 3, and water absorbing fan blades 4, the battery 2 is positioned at a rear part of the shell 1, the drive motor 3 is located at a front part of the shell 1, the water absorbing fan blades 4 are located in front of the drive motor 3 and are connected to an output shaft of the drive motor 3.

The battery 2 is enclosed in the battery case 5 to prevent water ingress, the battery case 5 comprises a first battery case 5-1 and a second battery case 5-2, the first battery case 5-1 and the second battery case 5-2 are sealed together with a sealing ring after they are aligned, the first battery case 5-1 and the second battery case 5-2 are configured to be fixed together using screws, but other fastening methods such as snap-fit connections are also be configured. For ease of installation, a front end of the first battery case 5-1 and a front end of the second battery case 5-2 are sleeved outside the drive motor 3, sealing rings are also used to seal between the front end of the first battery case 5-1 and the drive motor 3, and between the front end of the second battery case 5-2 and the drive motor 3.

A front end of the shell 1 is provided with external water inlets 6, the external water inlets 6 are opposite to the water absorbing fan blades 4.

The shell 1 is further provided with a bowl-shaped spray head 7.

The shell 1 is further provided with a water passage 8 for guiding water sucked from the external water inlets 6 to the spray head 7.

The shell 1 comprises a front shell 9 and a rear shell 10, the front shell 9 and the rear shell 10 are configured to rotate relative to each other.

The water passage 8 comprises a water guide shell 11 that wraps around the water absorbing fan blades 4, and a water guide channel 12 that extends downward from the water guide shell 11, a front end surface of the water guide shell 11 is provided with an internal water inlet 13 facing the external water inlets 6, a rear end of the water guide shell 11 is sleeved on the drive motor 3.

A lower part of the water guide channel 12 is adapted to the spray head 7, and the spray head 7 is sleeved on the lower part of the water guide channel 12, a lower end of the spray head 7 is provided with a water spray port 14. "The lower part of the water guide channel is adapted to the spray head" means that the shape of the lower part of the water guide channel 12 is adapted to that of an inner side surface of the spray head 7, allowing the spray head 7 to swing freely.

A lower end surface of the front shell 9 is provided with an opening 15 that is adapted to the spray head 7, the spray head 7 is inserted into the opening 15, with the water spray port 14 exposed. "The opening is adapted to the spray head" means that the shape of the opening 15 is adapted to that of an outer side surface of the spray head 7, allowing the spray head 7 to swing freely.

During operation, the invention works as in the prior art, the drive motor 3 operates, driving the water absorbing fan blades 4 to rotate, thereby drawing external water into the shell through the external water inlets 6. The water then passes through the internal water inlet 13 into the water passage 8, and is ultimately ejected from the water spray port 14 of the spray head 7 under the guidance of the water passage 8.

Different from the prior art, the hydrotherapy machine of the invention is capable of adjusting the water flow ejected from the water spray port in multiple directions: on one hand, as in the prior art, the spray head 7, being bowl-shaped, is configured to swing freely to adjust the spraying direction. On the other hand, since the front shell 9 and the rear shell 10 are configured to rotate relative to each other, and the rear end of the water guide shell 11 of the water passage is mounted on the drive motor 3, the front shell 9 is configured to rotate, and the water passage 8 is also configured to rotate. When the front shell 9 rotates, it drives the water passage 8 and the spray head 7 to rotate synchronously, allowing adjustment of the spraying direction in another direction.

In one embodiment, the shell 1 is provided with suction cups 16. When in use, the user can attach the hydrotherapy machine to an external environment such as a bathtub using the suction cups 16.

In one embodiment, an outer side of a lower end of the water guide channel 12 is provided with a sealing ring 17, the sealing ring 17 abuts against an inner side wall of the spray head 7. The sealing ring 17 has two significant functions: on one hand, it seals the water drawn in, preventing leakage between the water guide channel 12 and the spray head 7; as a result, almost all of the water is ejected from the water spray port 14 of the spray head 7, ensuring the strength of the hydrotherapy water flow; on the other hand, due to the presence of the sealing ring 17, the spray head 7 has a damping sensation when it swings to adjust the spraying angle, enhancing the comfort of operation.

In one embodiment, for ease of assembly, the water guide channel 12 is divided into two sections: an upper water guide channel 12-1 on an upper section is connected to the water guide shell 11; the preferred implementation is that the upper water guide channel 12-1 is integrally formed with the water guide shell 11. A lower water guide channel 12-2 on a lower section is tightly sleeved on the upper water guide channel 12-1, and a lower part of the lower water guide channel 12-2 forms a shape compatible with the spray head. When the sealing ring 17 is used, the sealing ring 17 is arranged on an outer side surface of a lower end of the lower water guide channel 12-2.

In one embodiment, the method of achieving relative rotation between the front shell 9 and the rear shell 10 is as follows: a rear end of the front shell 9 is provided with a recessed ring 18, a front end of the rear shell 10 is provided with a protruding ring 19, the protruding ring 19 is inserted into the recessed ring 18. Alternatively, the rear end of the front shell may be provided with a protruding ring, and the front end of the rear shell with a recessed ring, with the protruding ring fitting into the recessed ring.

In one embodiment, for ease of assembly, the front shell 9 comprises a first front side shell 9-1, a second front side shell 9-2, and a third bottom shell 9-3. The first front side shell 9-1 and the second front side shell 9-2 are joined together, and the third bottom shell 9-3 is connected to lower ends of the first front side shell 9-1 and the second front side shell 9-2. The specific connection method can be as follows: the first front side shell 9-1 and the second front side shell 9-2 are connected by snap-fit or ultrasonic welding; the third bottom shell 9-3 is respectively snap-fitted or ultrasonically welded to the first front side shell 9-1 and the second front side shell 9-2. For example, the first front side shell 9-1 is provided with front snap lugs, the front snap lugs are provided with front snap notches, the second front side shell 9-2 is provided with front snap blocks, the front snap blocks snap into the front snap notches, the third bottom shell 9-3 is provided with front snap hooks, the first front side shell 9-1 and the second front side shell 9-2 are provided with front snap edges, the front snap hooks are hooked tightly on the front snap edges.

In one embodiment, inner side surfaces of the first front side shell 9-1 and the second front side shell 9-2 are both provided with front convex ribs. After assembly, the front convex ribs abut against the drive motor 3, making the assembly of the first front side shell 9-1 and the second front side shell 9-2 more stable.

In one embodiment, for ease of assembly, the rear shell 10 comprises a first rear side shell 10-1, a second rear side shell 10-2, and a third tail cover 10-3. The first rear side shell 10-1 and the second rear side shell 10-2 are joined together, and the third tail cover 10-3 is connected to rear ends of the first rear side shell 10-1 and the second rear side shell 10-2. The specific connection method can be as follows: the first rear side shell 10-1 and the second rear side shell 10-2 are snap-fitted or ultrasonic welding; the third tail cover 10-3 is respectively snap-fitted or ultrasonically welded to the first rear side shell 10-1 and the second rear side shell 10-2. For example, the first rear side shell 10-1 is provided with rear snap lugs, the rear snap lugs are provided with rear snap notches, the second rear side shell 10-2 is provided with rear snap blocks, the rear snap blocks snap into the rear snap notches, the third tail cover 10-3 is provided with rear snap hooks, the first rear side shell 10-1 and the second rear side shell 10-2 are provided with rear snap edges, the rear snap hooks are hooked tightly on the rear snap edges.

In one embodiment, inner side surfaces of the first rear side shell 10-1 and the second rear side shell 10-2 are both provided with rear convex ribs. After assembly, the rear convex ribs abut against the battery case 5, making the assembly of the first rear side shell 10-1 and the second rear side shell 10-2 more stable.

In one embodiment, a hanging ring 20 may be arranged on the third tail cover 10-3 to facilitate the storage of the hydrotherapy machine In one embodiment, a protruding boss 21 is arranged at a rear end of the rear shell 10 (in the figure, this is on the third tail cover 10-3), the protruding boss 21 is provided with an air tube connector 22 extending into an interior of the rear shell 10, a surface of the protruding boss 21 is provided with a curved ventilation groove 23, the air tube connector 22 communicates with the ventilation groove 23, a tube is sleeved on the air tube connector 22, and the tube extends into the front shell 9; a knob 24 is sleeved on the protruding boss 21, and an inner end surface of the knob 24 is provided with inwardly protruding protruding portions 25, the protruding portions 25 abut against an end surface of the protruding boss 21; an end surface of the knob 24 is provided with ventilation holes 26 that pass through the end surface, and the ends of the ventilation holes 26 penetrate the protruding portions 25; when the knob 24 is rotated, the ventilation holes 26 can align with the ventilation groove 23. The significance of this mechanism is that, due to the water absorption effect of the front water absorbing fan blades 4, an interior of the shell 1 is relatively under low pressure. At this point, external air can enter through the ventilation hole 26 on the knob 24. When the knob 24 is rotated to align the ventilation hole 26 with the ventilation groove 23, external air can enter the ventilation groove 23 and flow into the air tube connector 22, then be transmitted via the tube to the front shell 9, generating bubbles for a surf effect. When the knob 24 is rotated such that the ventilation hole 26 does not align with the ventilation groove 23, the ventilation hole 26 is blocked, and no air is released. The tube is preferably extended to the vicinity of the external water inlets 6 of the front shell 9, facilitating bubbling. In one embodiment, a clip 27 is arranged on the water guide shell 11, allowing the tube to be clipped onto the clip 27, aiding in securing it.

In one embodiment, the protruding boss 21 is provided with a central groove 28, and the knob 24 is provided with a central shaft 29, the central shaft 29 passes through the central groove 28 to facilitate the installation and rotation of the knob 24.

In one embodiment, the ventilation groove 23 gradually widens from its head to tail, and the air tube connector 22 communicates with the ventilation groove 23 at the tail or the head of the ventilation groove 23; at this point, by adjusting the relative position between the ventilation hole 26 and the ventilation groove 23, the air flow rate can be adjusted: when the ventilation hole 26 corresponds to a narrower section of the ventilation groove 23, the air outflow rate is smaller; when the ventilation hole 26 corresponds to a wider section of the ventilation groove 23, the air outflow rate is larger.

In the description of the specification, the terms "one embodiment", "some embodiments", "example", "specific example", or "some examples", etc., mean the specific features, structures, materials, or characteristics described in connection with the embodiment or example are included in at least one embodiment or example of the invention. In this specification, indicative expressions of the above terms do not necessarily refer to the same embodiment or example. Furthermore, the specific features, structures, materials or characteristics described may be combined in an appropriate manner in any one or more embodiments or examples.

The above describes the embodiments of the invention. However, the invention is not limited to the above embodiments. Any modification, equivalent replacement, improvement, etc. made within the spirit and principle of the invention shall be included in the protection scope of the invention.

The invention claimed is:

1. A hydrotherapy machine, comprising a shell, the shell is provided with a battery, a drive motor, and water absorbing fan blades, the battery is positioned at a rear part of the shell, the drive motor is located at a front part of the shell, the water absorbing fan blades are located in front of the drive motor and are connected to an output shaft of the drive motor;

a front end of the shell is provided with external water inlets, the external water inlets are opposite to the water absorbing fan blades;

the shell is further provided with a bowl-shaped spray head;

the shell is further provided with a water passage for guiding water sucked from the external water inlets to the spray head;

the shell comprises a front shell and a rear shell, the front shell and the rear shell are configured to rotate relative to each other;

the water passage comprises a water guide shell that wraps around the water absorbing fan blades, and a water guide channel that extends downward from the water guide shell, a front end surface of the water guide shell is provided with an internal water inlet facing the external water inlets, a rear end of the water guide shell is sleeved on the drive motor;

a lower part of the water guide channel is adapted to the spray head, and the spray head is sleeved on the lower part of the water guide channel, a lower end of the spray head is provided with a water spray port;

a lower end surface of the front shell is provided with an opening that is adapted to the spray head, the spray head is inserted into the opening, with the water spray port exposed.

2. The hydrotherapy machine of claim 1, wherein an outer side of a lower end of the water guide channel is provided with a sealing ring, the sealing ring abuts against an inner side wall of the spray head.

3. The hydrotherapy machine of claim 1, wherein a rear end of the front shell is provided with a recessed ring, a front end of the rear shell is provided with a protruding ring, the protruding ring is inserted into the recessed ring;

alternatively, the rear end of the front shell is provided with a protruding ring, and the front end of the rear shell is provided with a recessed ring, with the protruding ring fitting into the recessed ring.

4. The hydrotherapy machine of claim 1, wherein the front shell comprises a first front side shell, a second front side shell, and a third bottom shell, the first front side shell and the second front side shell are joined together, and the third bottom shell is connected to lower ends of the first front side shell and the second front side shell.

5. The hydrotherapy machine of claim 4, wherein the first front side shell and the second front side shell are connected by snap-fit or ultrasonic welding, the third bottom shell is respectively snap-fitted or ultrasonically welded to the first front side shell and the second front side shell.

6. The hydrotherapy machine of claim 1, wherein the rear shell comprises a first rear side shell, a second rear side shell, and a third tail cover, the first rear side shell and the second rear side shell are joined together, and the third tail cover is connected to rear ends of the first rear side shell and the second rear side shell.

7. The hydrotherapy machine of claim 6, wherein the first rear side shell and the second rear side shell are snap-fitted or ultrasonic welding; the third tail cover is respectively snap-fitted or ultrasonically welded to the first rear side shell and the second rear side shell.

8. The hydrotherapy machine of claim 1, wherein a protruding boss is arranged at a rear end of the rear shell, the protruding boss is provided with an air tube connector extending into an interior of the rear shell, a surface of the protruding boss is provided with a curved ventilation groove, the air tube connector communicates with the ventilation groove, a tube is sleeved on the air tube connector, and the tube extends into the front shell;

a knob is sleeved on the protruding boss, and an inner end surface of the knob is provided with inwardly protruding portions, the protruding portions abut against an end surface of the protruding boss;

an end surface of the knob is provided with ventilation holes that pass through the end surface, and ends of the ventilation holes penetrate the protruding portions;

when the knob is rotated, the ventilation holes can align with the ventilation groove.

9. The hydrotherapy machine of claim 8, wherein the ventilation groove gradually widens from its head to tail, and the air tube connector communicates with the ventilation groove at the tail or the head of the ventilation groove.

10. The hydrotherapy machine of claim 8, wherein the protruding boss is provided with a central groove, and the knob is provided with a central shaft, the central shaft passes through the central groove.

* * * * *